Figure 1:
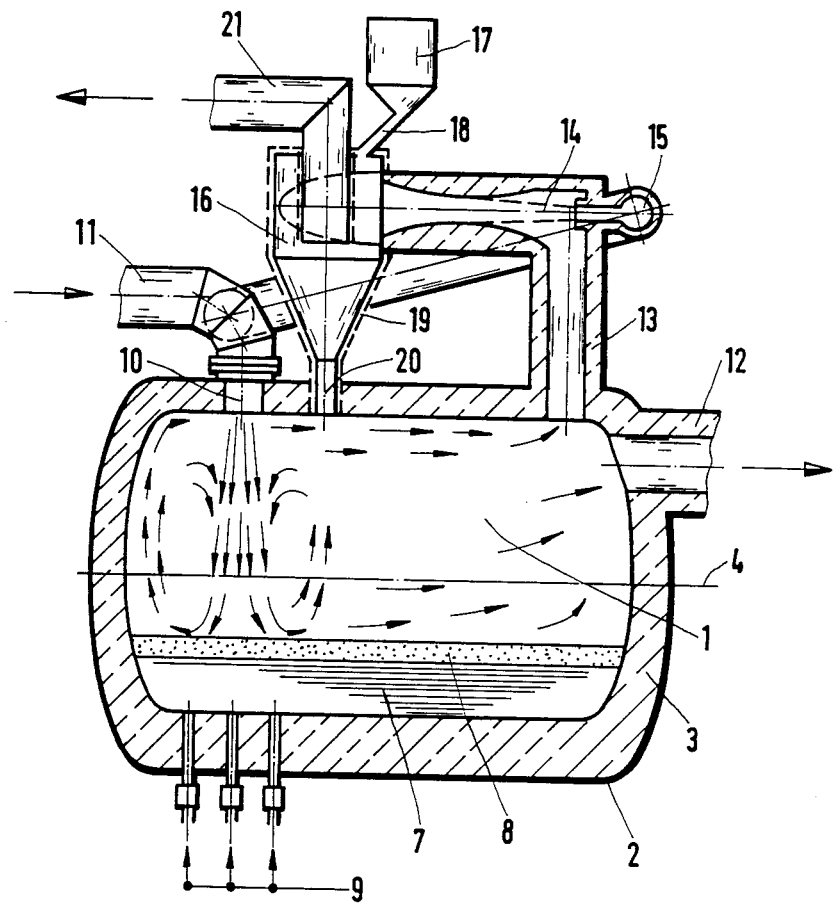

United States Patent [19]

Fassbinder et al.

[11] Patent Number: 4,849,015
[45] Date of Patent: Jul. 18, 1989

[54] METHOD FOR TWO-STAGE MELT REDUCTION OF IRON ORE

[75] Inventors: Hans-Georg Fassbinder, Sulzbach-Rosenberg; Jonathan P. Moodie, Amberg, both of Fed. Rep. of Germany; Trenna R. Turner, Applecross, Australia

[73] Assignee: Kloeckner CRA Technologie GmbH, Duisburg, Fed. Rep. of Germany

[21] Appl. No.: 23,366

[22] Filed: Mar. 9, 1987

[30] Foreign Application Priority Data

Mar. 8, 1986 [DE] Fed. Rep. of Germany ....... 3607774

[51] Int. Cl.$^4$ ............................................. C22B 13/14
[52] U.S. Cl. ........................................... 75/26; 75/40; 266/156
[58] Field of Search ...................... 75/26, 40; 266/156

[56] References Cited

U.S. PATENT DOCUMENTS 2,745,737  5/1956  Oster ....................................... 75/40
3,028,231  4/1962  Klemantaski et al. ................... 75/40
3,264,096  8/1966  Agarwal et al. ......................... 75/26

*Primary Examiner*—Melvyn J. Andrews
*Attorney, Agent, or Firm*—Armstrong, Nikaido, Marmelstein, Kubovcik & Murray

[57] ABSTRACT

A method for two-stage melt reduction of iron ore, in which iron ore is prereduced substantially to wustite and at the same time melted down in a melting cyclone, and then liquid hot metal is produced in an iron bath reactor connected to the outlet of the melting cyclone and receiving the melted wustite by adding carbonaceous fuels and oxidizing gas to the melt. The resulting reaction gas from the melt is afterburned, and the dust-laden, partly burned reaction gases from the iron bath reactor are accelerated and further afterburned by adding a hot blast with a temperature of 800° C. to 1500° C., and at least a portion of such accelerated, after burned reaction gases are introduced into the melting cyclone to reduce and melt fresh iron ore.

11 Claims, 1 Drawing Sheet

METHOD FOR TWO-STAGE MELT REDUCTION OF IRON ORE

FIELD OF THE INVENTION

The present invention relates to a method for the two-stage melt reduction of iron ore, in which iron ore is preduced substantially to FeO and at the same time melted down in a melting cyclone, and then liquid hot metal is produced by the addition of carbonaceous fuels and oxidizing gas to an iron bath reactor connected to the outlet of the melting cyclone and receiving the melted wustite. Preheated air, i.e., a hot air blast, is preferably used as the oxidizing gas and blown onto the iron melt to achieve a high afterburning degree of 30% to 50% of the reaction gases CO and $H_2$ escaping from the iron melt. That is, 30 to 50 percent of the CO and $H_2$ escaping from the iron melt are converted into $CO_2$ and $H_2O$ in the afterburning.

BACKGROUND OF THE INVENTION

A number of methods of producing liquid hot metal directly from ore are already known. Some of these known processes are performed only in one reactor vessel, while in other methods the melt-down vessel in separate from the reduction vessel for the iron ore.

European patent application No. 0,114,040 describes a method for producing liquid hot metal and reduction gas in a melt-down gasifier by adding coal and blowing in the oxygen-containing gas in connection with a twolayer fluidized bed of coke particles and blowing in the oxygen-containing gas on several levels.

German "offenlegungsschrift" No. 30 34 539 relates to a process for directly producing liquid hot metal from lumpy iron ore which is reduced to sponge iron in the form of a loosely packed bed by means of a hot reduction gas in a direct reduction shaft furnace, and then fed in the hot state through a discharge means to a melt-down gasifier. In this vessel the sponge iron is melted down by adding coal and oxygen-containing gas, and the reduction gas is produced for the shaft furnace.

European patent application No. 0 126 391 describes an advantageous composite process with an ore reduction vessel and a melt-down vessel, in which the reaction gases escaping from the iron melt are partly afterburned in the melt-down vessel, with the resulting heat transferred to a large extent to the melt. The reaction gases are cooled off and reduced by reducing agents on the way to the ore reduction vessel.

All known methods share, although to different extents, the disadvantage that they work with a gas surplus. Even in the known two-stage methods the gas is still relatively rich in energy after the prereduction of the iron ore and is to be used as a combustion gas. Accordingly, the economy of the described processes is clearly determined by the possible utilization of their surplus gas.

SUMMARY OF THE INVENTION

The present invention is thus based on the problem of providing a method which not only uses low-energy coal, or coal with a high proportion of volatile components, but also produces virtually no gas surplus to be burned further, and solves the prereduction of the iron ore in a simple manner.

The inventive method solves this problem by accelerating and further afterburning the dust-laden, partly burned reaction gases from the iron bath reactor on the way to the melting cyclone by adding to the gas stream a hot air blast having a temperature of 800° C. to 1500° C., preferably 1100° C. to 1300° C.

DETAIL DESCRIPTION OF THE INVENTION

According to the present invention, liquid hot metal is produced in an iron bath reactor. This iron bath reactor can have a converter-like shape as in steel-making or can be a largely closed, elongated, drum-like melt-down vessel. The iron bath reactor is in any case provided with feed nozzles having a protective medium sheathing below the bath surface, and top blowing means in the form of nozzles and/or lances above the bath surface. The hot metal can be discharged from the reactor both continuously and discontinuously via a tap hole that can be closed in the known way or may remain open.

Carbonaceous fuels, such as coke, carbonized lignite, petroleum coke, etc., but preferably coal of varying quality, are fed to the melt in the iron bath reactor. Slag-forming additives, such as lime, fluorspar, etc., are also fed to the iron melt to set the desired slag composition. Although it is irrelevant for the present invention whether these substances are introduced into the melt on the bath surface or from below the bath surface, it is preferable to add them through underbath feed nozzles.

However, oxygen and/or other oxidizing gases are only blown into the iron melt to a limited extent below the bath surface. Preheated air, i.e., a hot air blast, is preferably blown onto the bath surface to achieve a high after-burning degree of the reaction gases escaping from the melt. The air blast feed means used may be conventional lances and/or nozzles with or without cooling or protective medium sheathing. However, nozzles, tuyeres or nozzle-like apertures in the refractory lining of the iron bath reactor without a cooling medium are preferably used.

The reaction gases from the melt, mainly CO and $H_2$, are afterburned by approximately 30 to 50 percent to $CO_2$ or $H_2O$, and the heat released thereby is transferred to the melt. The teachings of Germany Pat. No. 28 38 983, the disclosure of which is hereby incorporated by reference, are thus largely applied.

According to the invention, the waste gases from the iron bath reactor, which mainly consist of CO, $CO_2$, $H_2$, $H_2O$ and $N_2$, and which entrain varying amounts of dust and fine iron or iron oxide droplets are fed directly to the melting cyclone. According to the present invention, it is also possible to conduct only part of the stream, e.g., approximately 30% to 80%, preferably 40% to 60%, to the melting cyclone while using the rest of the gas in other uses, such as, e.g., as a feed to a waste heat boiler, for example, wherein the gas stream is cooled off and then using the cooled waste gas which is largely free from dust to preheat air. The waste gas of the second part of the gas stream (that which is not fed to the melting cyclone), is preferably used in different applications to prereduce iron ore or as hot gas.

The location of the melting cyclone can be basically freely selected according to the present invention. However, a preferred embodiment according to the present invention is for the melting cyclone to be installed in direct contact with the iron bath reactor, so that the premelted product largely consisting of wustite can flow directly from the melting cyclone into the iron bath reactor.

An essential feature of the present invention is that the reaction gases from the iron bath reactor are accelerated and further afterburned before entering the melting cyclone by adding thereto a hot air blast with a temperature of 800° C. to 1500° C., preferably 1100° C. to 1300° C. It has surprisingly been shown that by feeding the hot air blast into the conduit of the reaction gases going to the melting cyclone as the driving jet of an ejector pump, preferably of the aspirator type, and preferably just before (upstream of) a venturi-shaped diffuser, further afterburning of the reaction gases already preburned by 30 to 50 mol percent can be obtained to the point of complete combustion, but definitely of at least up to 65 mol percent and preferably of at least 80 mol percent. The heat released thereby and the reduction potential of the gases suffice to produce liquid FeO, i.e., wustite, in the melting cyclone. According to the invention, the injector pump operated by the hot air blast causes a pressure increase in the gases entering the melting cyclone of approximately 20 to 80 mbar, preferably 25 to 50 mbar. At the same time the added hot air blast makes it possible to obtain a high afterburning degree of the waste gases of from at least 65 mol percent to the point of complete combustion, and thus a high temperature of the gases generally of more than 2000° C., when they enter the melting cyclone.

According to the invention, iron ore in a ground form can be blown into the melting cyclone together with the hot air blast of the injector pump. However, the ore can also be added to the melting cyclone, independently of the hot blast, directly through a separate aperture, for example in the entrance area of the hot gases.

Further process substances, mainly slag-forming additives, such as lime, are preferably fed to the melting cyclone. It has proved useful to add limestone to the melting cyclone for the heat balance, in particular when there is a sufficient heat supply avilable in the melting cyclone. Such heat exploitation of the hot combustion gases in the melting cyclone serves not only to reduce and melt down the iron ore, but at the same time to deacidify the limestone, which has an advantageous effect on the economy of the overall process.

The cyclone vessel preferably has water-cooled walls which are provided with surface roughnesses so that an iron oxide layer freezes on the wall as a firm protective skin on whose surface the liquid wustite runs off. This structure of the melting cyclone increases its dust separating effect, since an immersion tube, which is important for separating out particles having a diameter in the u range, can thus be used in spite of the high operating temperature.

The heat balance, and thus the effectiveness of the inventive method, can be positively affected by the oxygen enrichment of the hot air blast. Thus, a hot air blast enriched with oxygen by up to 50 volume percent is preferably used. This measure must of course be considered from case to case with respect to its economy, and is always advisable when oxygen is available inexpensively, on the one hand, and high ore melt-down rates are required, on the other hand.

The melting cyclone will normally have a pressure therein of about 1 bar to about 2 bar, and the molten wustite discharged from the melting cyclone will normally have a temperature of from 1400° to 1700° C., preferably about 1500° C. The melt in the iron bath reactor will normally have a temperature of 1400° to 1600° C., and preferably about 1500° C., and the iron bath reactor pressure will normally be from about 1 bar to about 2.5 bar. While the temperature of the two hot air blasts may differ, it is convenient for these hot air blasts to have a common origin, so that the temperatures will be substantially identical.

The waste gases discharged from the iron bath reactor have a temperature of 1500° to 2000° C., preferably 1600° to 1700° C. After the introduction of the second step afterburning hot air blast, the resulting reaction gases (that is, the temperature of the gases entering the melting cyclone without ore addition thereto) have a temperature of 1600° to 2600° C., and preferably about 2000° to 2300° C.

DESCRIPTION OF THE DRAWING AND EXAMPLE OF THE INVENTION

The invention shall be described in the following in more detal with reference to a schematic drawing and a non-restrictive example.

FIG. 1 shows a longitudinal cross-section of the iron bath reactor with an integrated melting cyclone.

An iron bath reactor 1 comprises a metal jacket 2 and a refractory lining 3. The reactor has substantially the shape of a horizontal drum and is symmetrical about drum axis 4. This iron bath reactor has in the newly bricked up state a free volume of approximately 100 m$^3$. This vessel contains an iron melt 7 to 50 to 120 t with a carbon content of approximately 2.5% and a temperature of 1600° C. On top of the iron melt there is a layer of slag 8 of approximately 2 t with CaO/SiO$_2$ ration of approximately 1.3.

Below the iron bath surface six feed nozzles 9 are installed in the refractory lining 3 of the vessel. The clear diameter of these feed nozzles 9 is 24 mm, through which the dust of a typical gas-flame coal is blown into the melt at a blowing in rate of 600 kg/min.

At the same time, a hot air blast with a temperature of approximately 1200° C. is blown onto the bath through tuyere 10 at a rate of 2000 Nm$^3$/min. The hot blast is supplied to tuyere 10 from a regenerator (not shown) via hot air blast conduit 11. The hot air blast jet causes the constant melting loss of the dissolved carbon in the melt, on the one hand, so that the carbon content of the bath remains approximately constant in spite of the continuous supply of coal through nozzles 9, and the hot air blast also causes the partial afterburning of the reaction gases CO and H$_2$ from the bath to CO$_2$ and H$_2$O, on the other hand. In the present case an average afterburning degree of 40 percent can be ensured, and the resulting heat is transferred to the melt with a thermal efficiency of approximately 90%.

The waste gas from the iron bath reactor has a composition of 23% CO, 8% CO$_2$, 6% H$_2$, 9% H$_2$O, 54% N$_2$. The volume of the gas stream is altogether 2400 NM$^3$/min. About half of the gas stream is fed directly to a waste heat boiler (not shown) via waste gas conduit 12, cooled there and then used to preheat air. The other half of the waste gas stream flows through conduit 13 and is sucked in by ejector pump 14, which is supplied with a hot air blast via feed conduit 15, accelerated and further afterburned. The ejector pump is supplied approximately 400 NM$^3$/min of hot air at a temperature of 1200° C. through supply conduit 15. The waste gas velocity in conduit 13 is about 20 to 60 meters per second, preferably about 30 meters per second. After passing through ejector pump 14 the total gas (including the hot air blast introduced therein) is accelerated to a speed of about 200 to 300 meters per second, preferably about 250 meters per second. This high gas speed results in a pressure increase in the melting cyclone 16 of about 0.03 to about 0.08 bar, and preferably 0.05 bar. The waste gas from the iron bath reactor is afterburned by 70 percent and enters melting cyclone 16 with an initial temperature of approximately 2500° C.

In the entrance area of melting cyclone 16, ground ore with a maximum grain size of approximately 1 mm is supplied from bunker 17 via conduit 18 at a throughput of 1500 kg/min. In melting cyclone 16, which is equipped with roughened water-cooled walls 19, the fine ore is melted down and reduced to FeO. The melt flows out of the melting cyclone via aperture 20 into iron bath reactor 1, where it is finally reduced to metallic iron.

The largely dustfree gas from melting cyclone 16 has a composition of $CO_2$ 25%, $H_2O$ 12% and $N_2$ 63% and a temperature of approximately 1500° C. It is supplied via conduit 21 to a further waste heat boiler (not shown) in order to utilize the heat content of the gas.

We claim:

1. In a method for the two-stage melt reduction of iron ore wherein iron ore is prereduced substantially to wustite and melted down in a melting cyclone, and the melt from the melting cyclone is introduced into an iron bath reactor wherein the melt is converted into liquid hot metal by addition of carbonaceous fuel and oxidizing gas, with reaction gases produced in the reactor being afterburned in the reactor in a first afterburning step to form afterburned reaction gases and sent at least in part to the melting cyclone, the improvement comprising accelerating and further afterburning the afterburned reaction gases from the iron bath reactor sent to the melting cyclone after the afterburned reaction gases leave the reactor and before the afterburned reaction gases enter the melting cyclone by adding thereto a hot air blast having a temperature of 800° to 1500° C.

2. The method of claim 1, wherein the reaction gases contain CO and $H_2$, and about 30 to 50 mol percent of the CO and $H_2$ in the reaction gases are afterburned in the first afterburning step, and in the further afterburning step the reaction gases are afterburned to a degree such as to convert at least 65 percent of the CO and $H_2$ in the original reaction gases to $CO_2$ and $H_2O$.

3. Method of claim 2 wherein 30 to 80% of the first step afterburned reaction gases from the iron bath reactor are fed to the melting cyclone.

4. Method of claim 2, wherein an ejector pump operated by a hot air blast is used to accelerate and afterburn the partly burned waste gases from the iron bath reactor.

5. Method of claim 1 or 4, wherein the pressure in the melting cyclone exceeds that in the iron bath reactor.

6. Method of claim 1 or 4, wherein ground iron ore is blown into the melting cyclone together with the hot air blast.

7. Method of claim 1 or 4, wherein the hot air blast has had oxygen content thereof increased up to 50% by volume of oxygen.

8. Method of claim 1 or 4, wherein the hot air blast has a temperature of about 1100° C. to 1300° C.

9. Method of claim 1 or 4, wherein the reaction gases are introduced into the melting cyclone through an aperture and ground iron ore is introduced into the melting cyclone through a separate aperture which is different than the aperture through which the reaction gases are introduced.

10. Method according to claim 1 or 4, wherein powdered slagforming additives are blown into the melting cyclone.

11. Method of claim 10, wherein ground limestone is blown into the melting cyclone.

* * * * *